ELLIS WILZINSKI.
CLAY WASHING & STONE SEPARATING MACHINE.
No. 74,967. Patented Feb. 25, 1868.
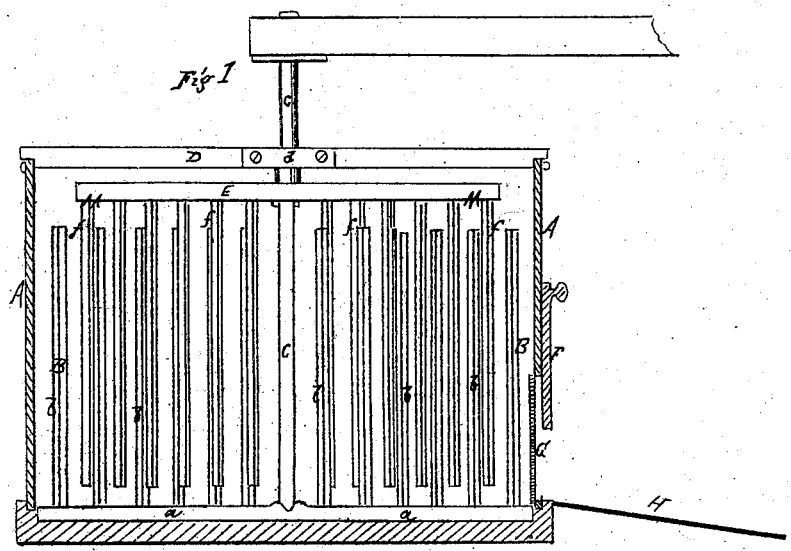
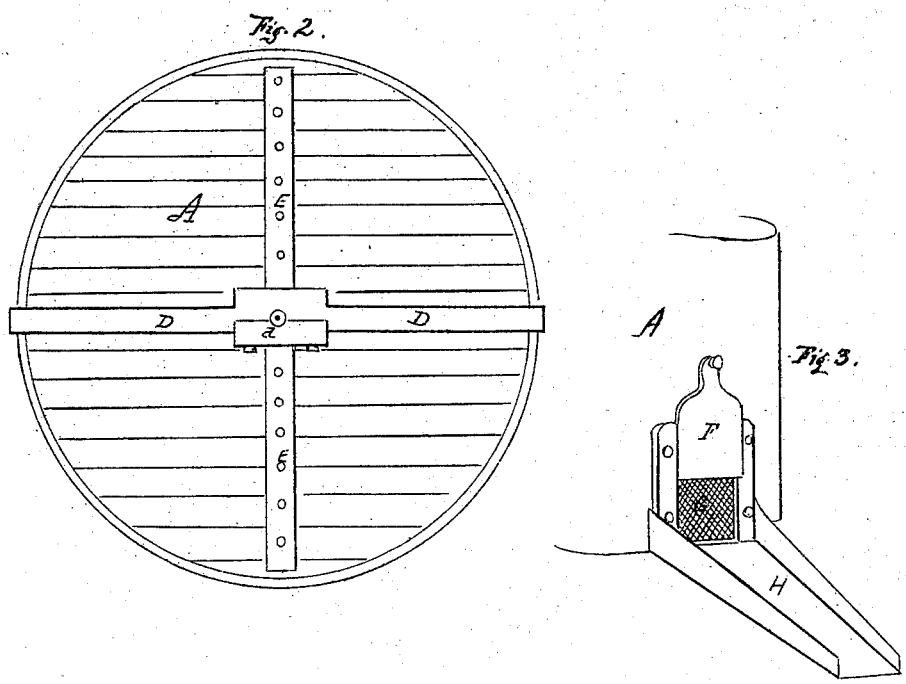

United States Patent Office.

ELLIS WILZINSKI, OF CHICAGO, ILLINOIS.

Letters Patent No. 74,967, dated February 25, 1868.

---

IMPROVEMENT IN CLAY-WASHING AND STONE-SEPARATING MACHINES.

---

The Schedule referred to in these Letters Patent and making part of the same.

---

TO ALL WHOM IT MAY CONCERN:

Be it known that I, ELLIS WILZINSKI, of the city of Chicago, in the county of Cook, and State of Illinois, have invented a new and useful "Clay-Washing and Stone-Separating Machine;" and I do hereby declare that the following is a full and exact description thereof, reference being had to the accompanying drawings, making part of this specification, in which—

Figure 1 represents the side elevation of the partition and beater with section of the tank.

Figure 2, the plan or top view of the tank; and

Figure 3, the sliding gate, strainer, and trough of the same.

As the clay very often contains stones, and particularly limestone, so injurious to the bricks, and the brick-makers labor under great disadvantage trying to produce brick without having that kind of clay previously washed and separated from stone, and of course producing an inferior article, the object of my invention is to supply the brick-yards with clay-washing and stone-separating machines, to prepare properly the clay, before it is moulded into bricks; and the nature of this invention consists in a tank to receive the clay and water, provided with a stationary partition, consisting of sharply-edged square rods, made of wrought iron or steel, and a beater, arranged in a similar way, and secured to a vertical shaft worked by any power, said partition and beater so arranged that the rods of the last pass through the intervals between those of the first, when working and washing and separating the clay from the stones. The tank is also provided with a sliding gate and a strainer, to let out the water and clay into a pit, as will be hereinafter fully explained.

To enable others skilled in the art to make and use my invention, I will proceed to describe its construction and operation.

A is a tank, made of wood, metal, or masonry, with thick wooden bottom. It may stand on the ground or on some foundation, and be from six to ten feet (more or less) in diameter, and from three to four feet (more or less) in height. B is a partition, made of an iron bar, $a$, sunk into the bottom of the tank, so as to be flush with the upper side of it, to which bar $a$, pickets, $b\ b$, made of square sharp-edged wrought iron or steel rods, are strongly secured. C is a vertical shaft having bearing in the bar $a$, and journalled in the bar D, which bar, D is laid across the tank and secured to the sides of it, and is provided with a shoulder, to admit the lug $d$, screwed to it, and to form thus, with said lug, a journal or bearing for the shaft C. Shaft C may be so arranged as to be worked by horse or steam-power. M is a beater, consisting of an iron bar, E, set firmly on shaft C; so as to revolve with it, and of pickets $ff$, made also of square sharp-edged wrought iron or steel rods, strongly secured to the bar E, and so disposed as to pass freely through the intervals between the pickets $b\ b$ when the machine is working. Pickets $ff$, as also pickets $b\ b$, may be secured to their respective bars by screws and nuts, for the purpose of readily changing or repairing the damaged pickets. F is a sliding gate, the opening of which is covered with a strainer, G, consisting of a metallic sheet, with perforations of one-sixteenth (more or less) of an inch in diameter. H is a trough, secured to the tank at and below the gate F, leading to a pit where the clay is dried.

The operation consists in this, that the clay is thrown into the tank partially filled with water, and the shaft C is put in operation, which, by revolving, revolves beater M, whose pickets $ff$ work the clay, and passing through pickets $b\ b$ of the partition B, separate stones from the clay, and accumulate them on the bottom of the tank. After the clay has been worked thoroughly, the gate F is opened, and the clay let run through the strainer G into trough H, conveying it to the pit or pits, where it is dried.

What I claim as my invention, and desire to secure by Letters Patent, is—

The tank A, provided with partition B, beater M, and sliding gate F, with strainer G; the whole constructed and operating substantially as and in the manner herein set forth, forming the clay-washing and stone-separating machine.

ELLIS WILZINSKI.

Witnesses:
 J. B. TURCHIN,
 L. H. LANE.